May 11, 1965  S. A. MENCACCI ETAL  3,182,583
APPARATUS FOR COOKING FISH
Filed Dec. 6, 1960  9 Sheets-Sheet 1
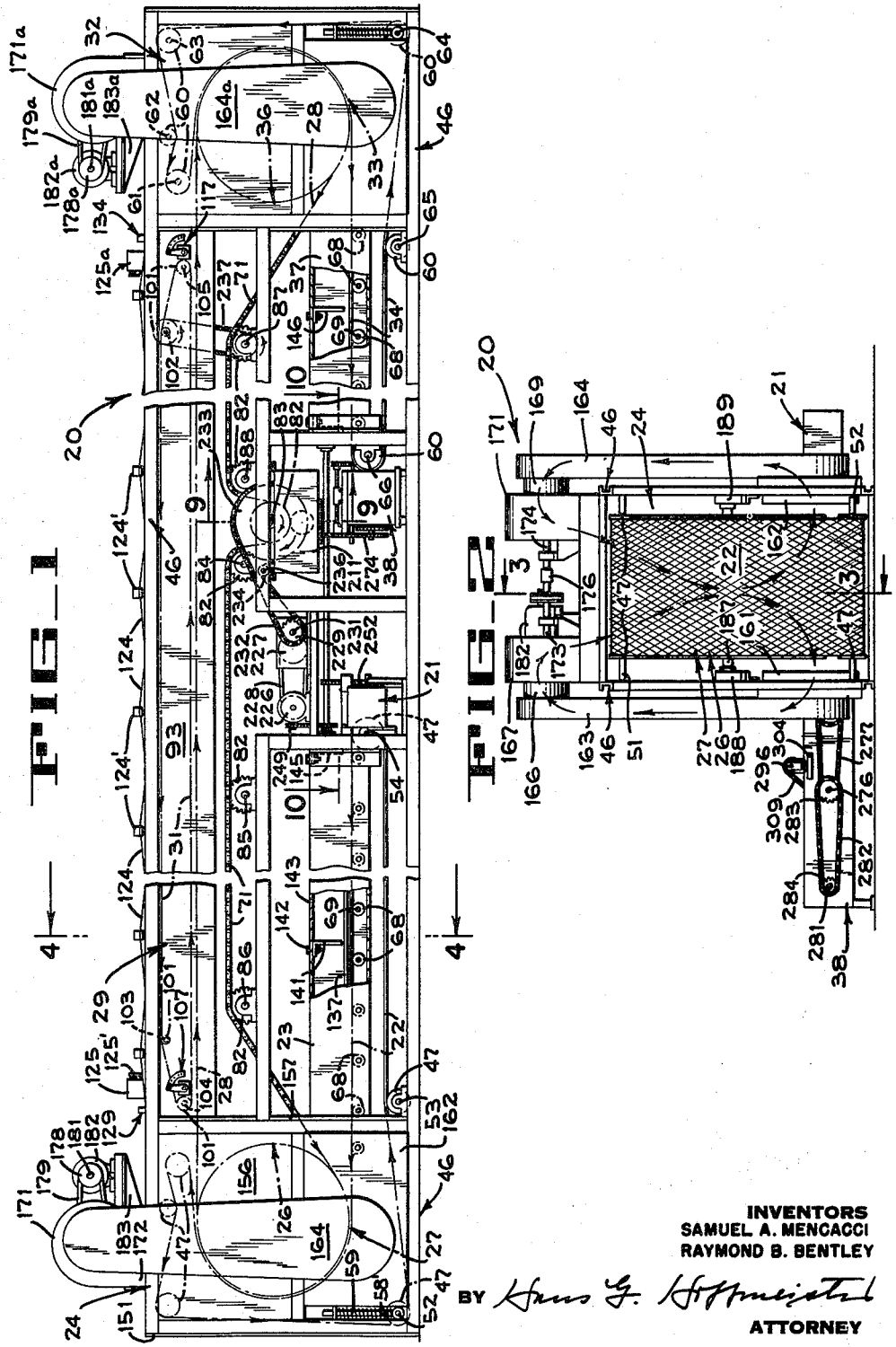
INVENTORS
SAMUEL A. MENCACCI
RAYMOND B. BENTLEY
BY
ATTORNEY

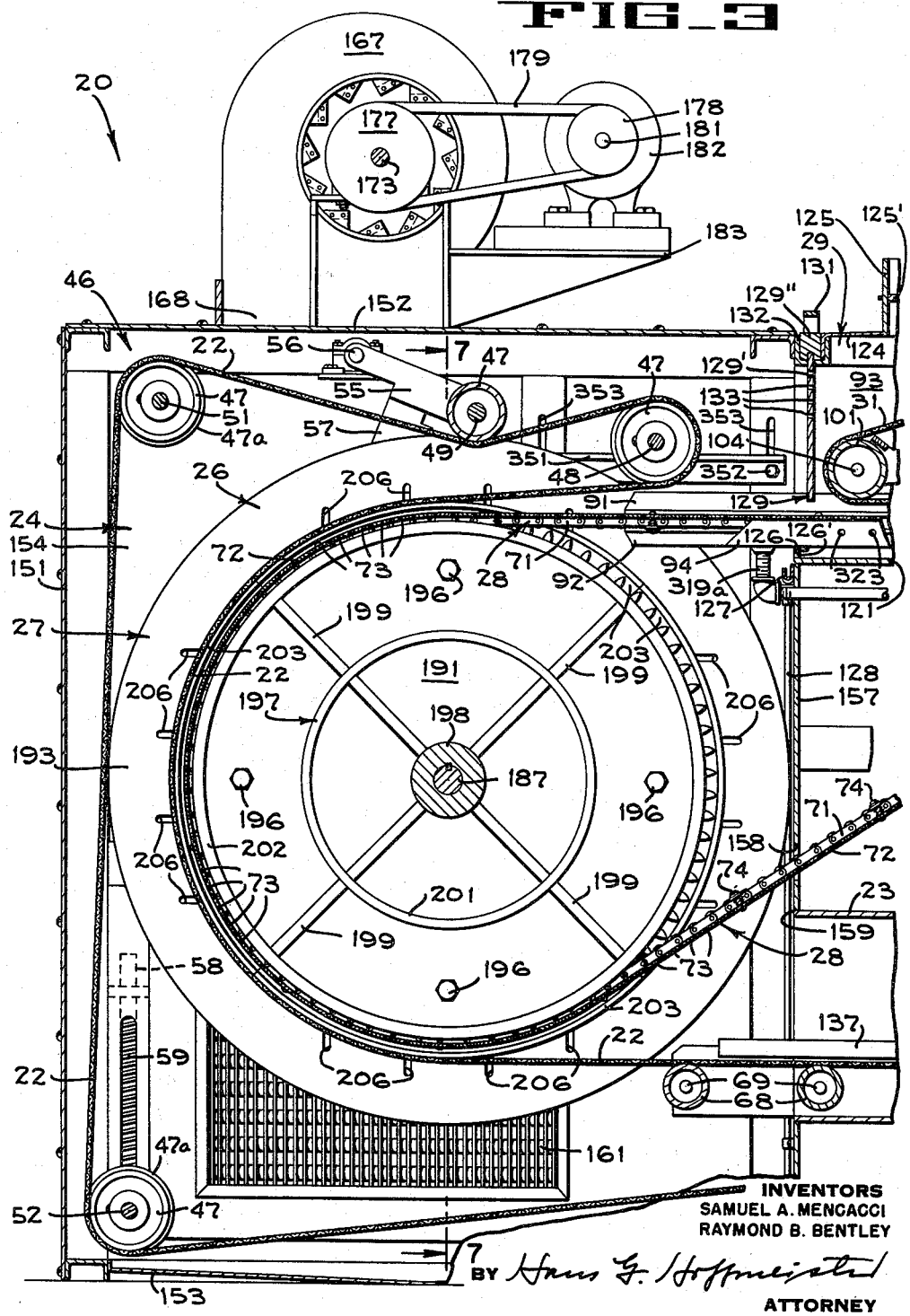

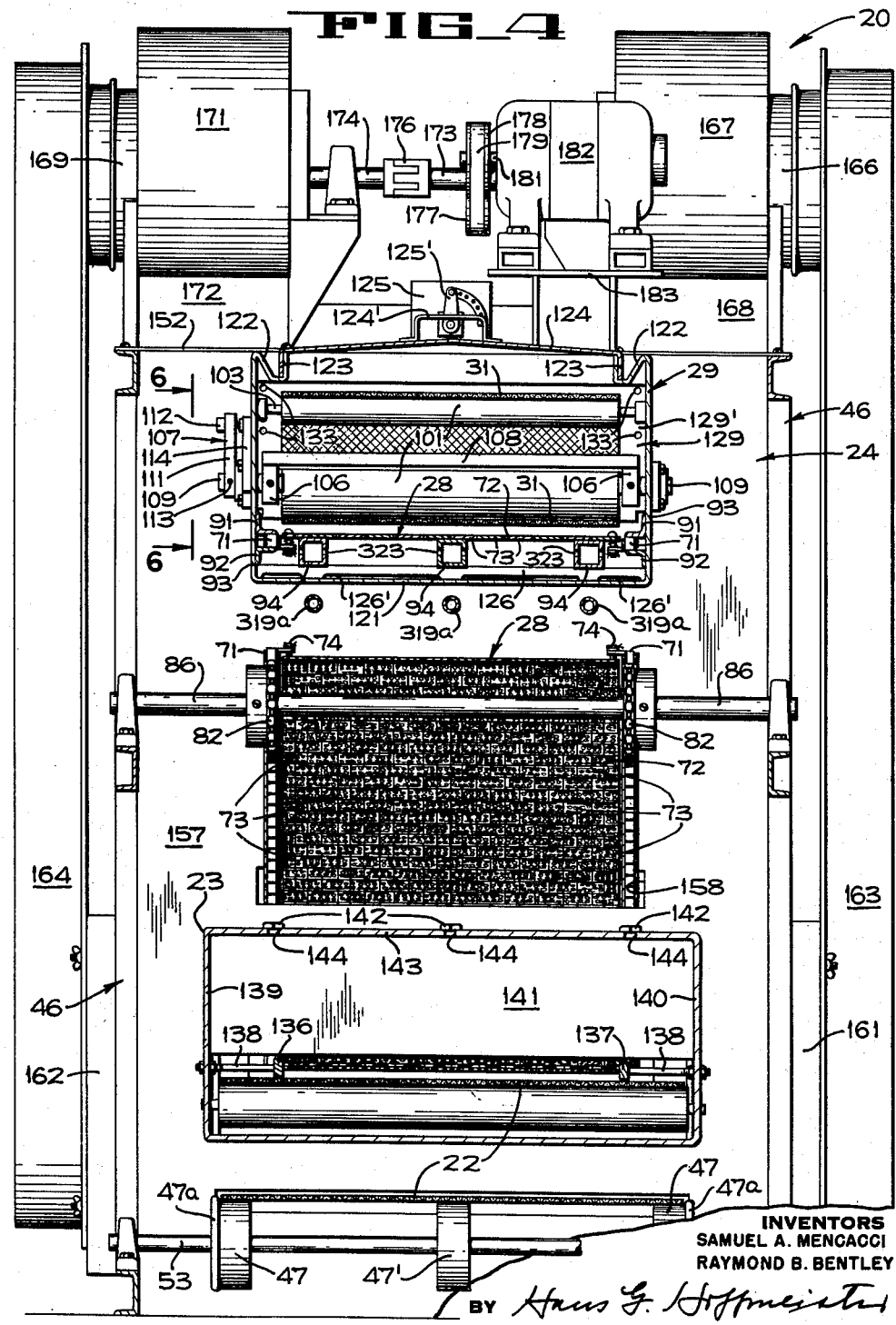

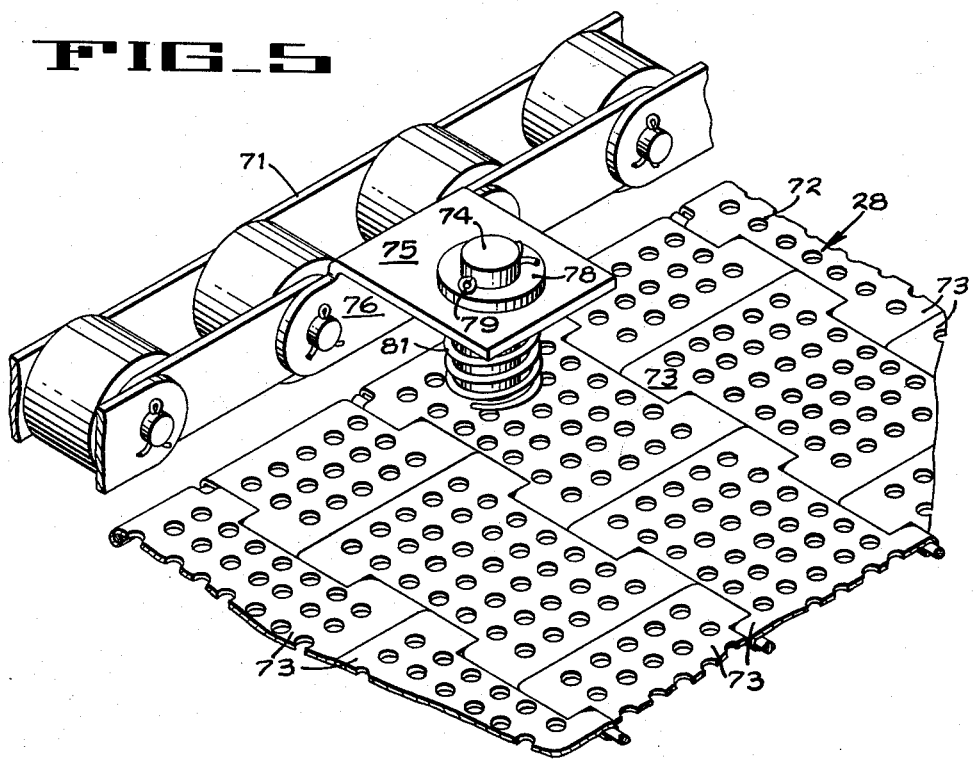
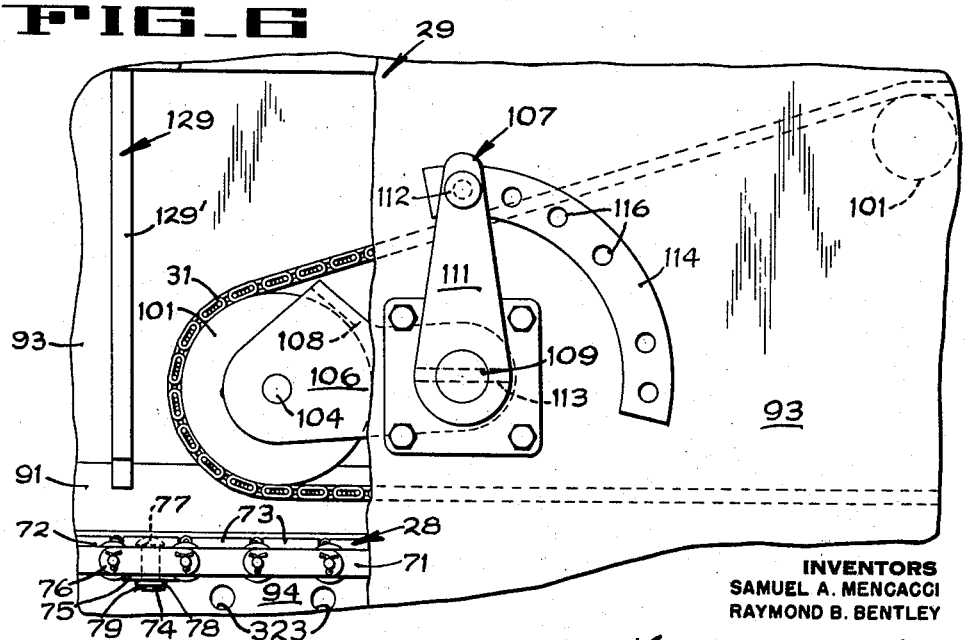

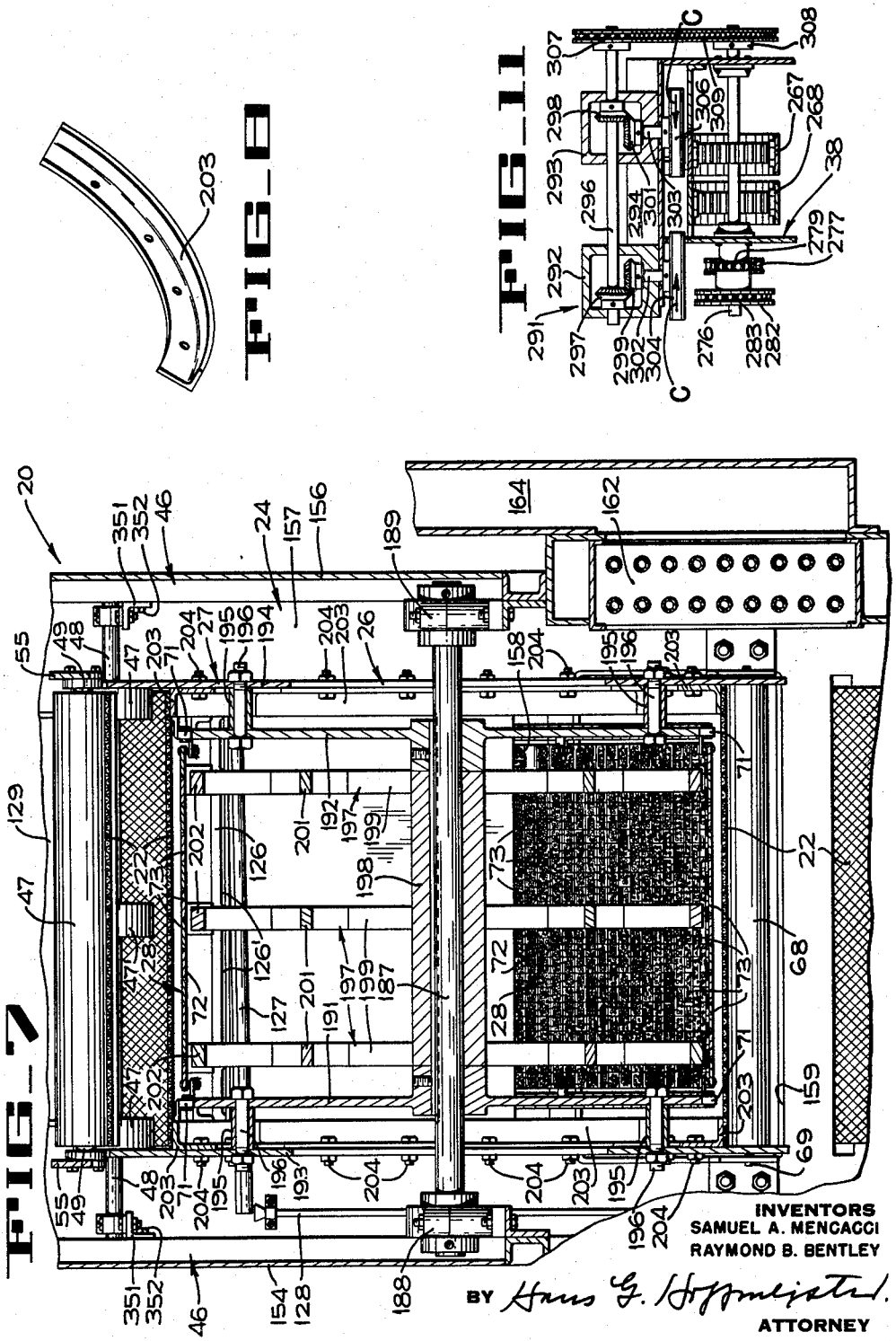

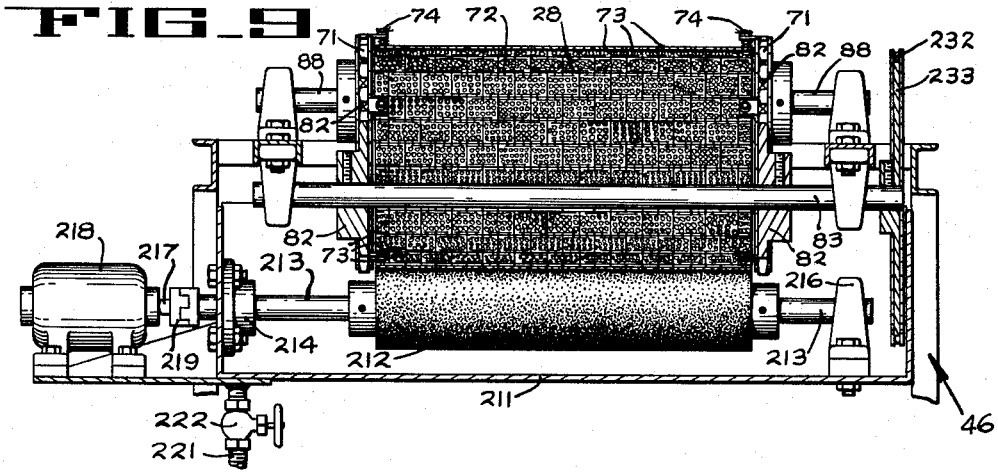
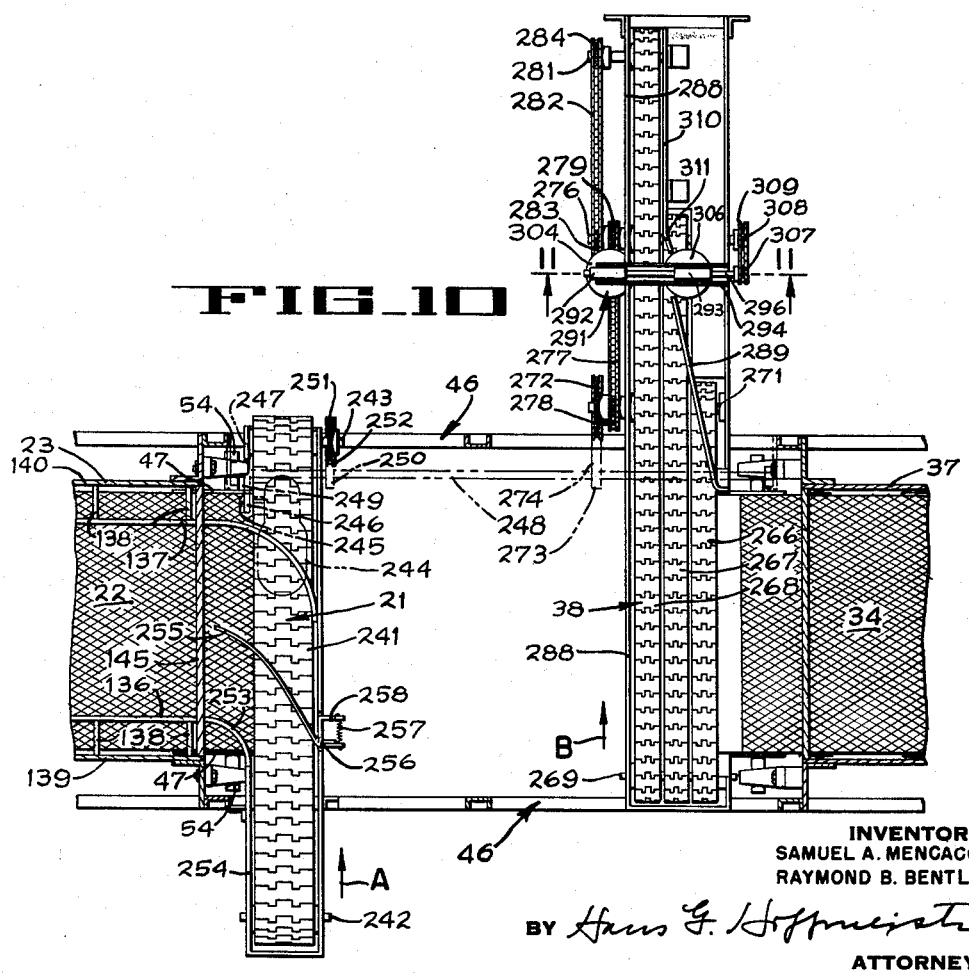

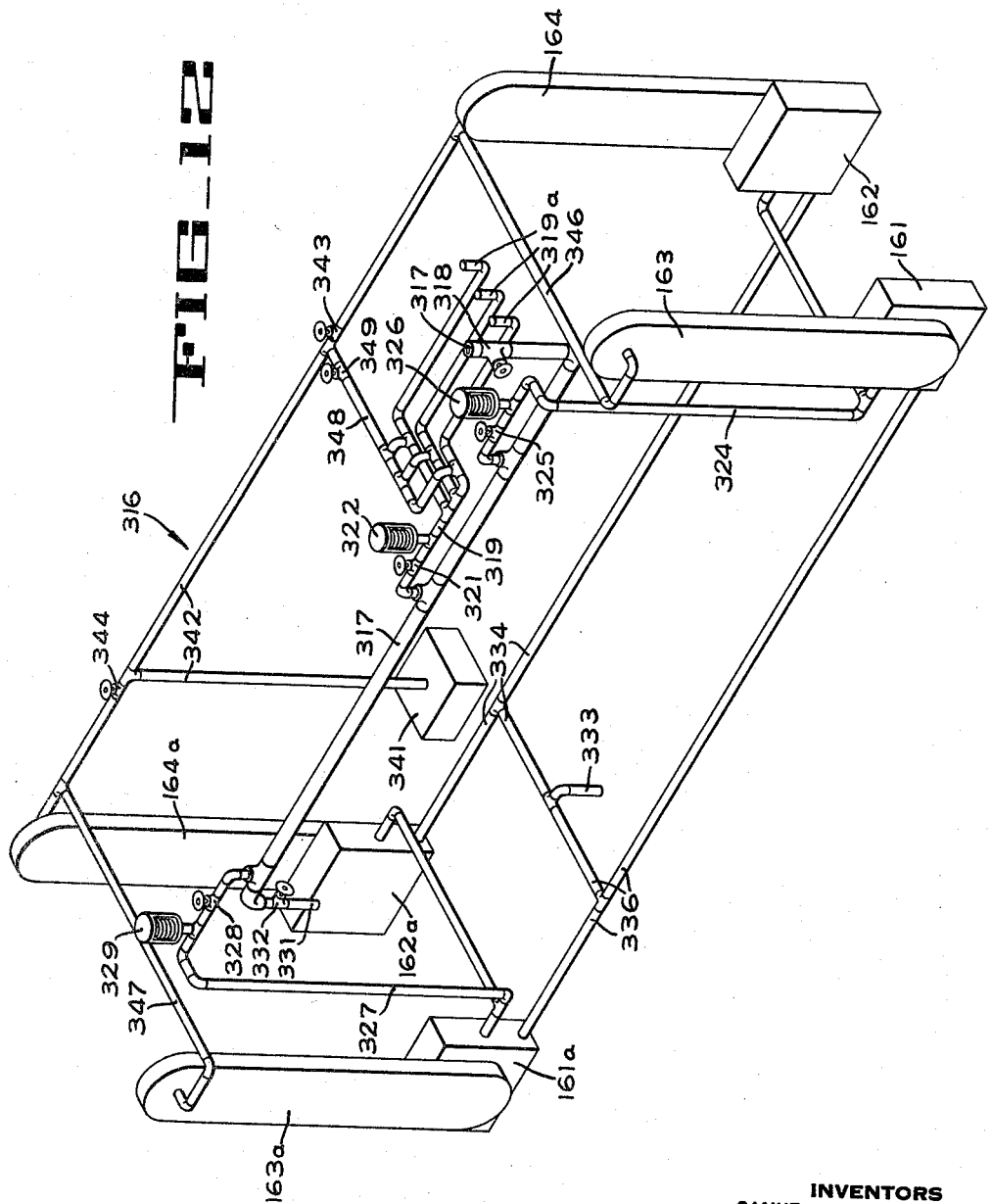

May 11, 1965
S. A. MENCACCI ETAL
3,182,583
APPARATUS FOR COOKING FISH
Filed Dec. 6, 1960
9 Sheets-Sheet 8
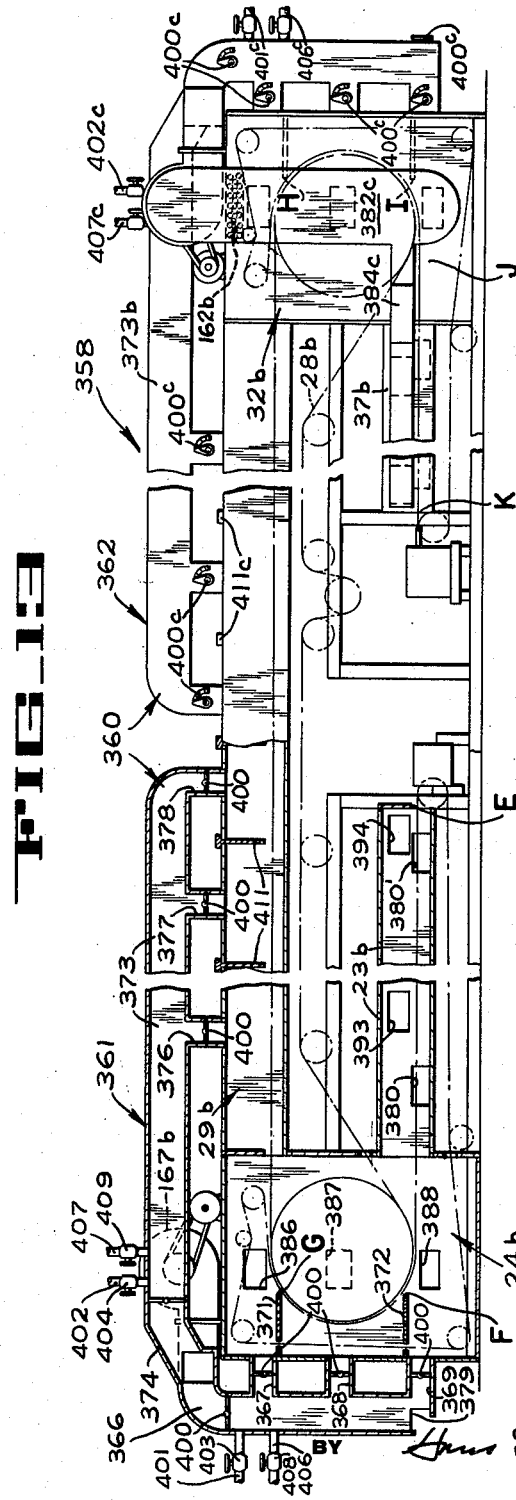
INVENTORS
SAMUEL A. MENCACCI
RAYMOND B. BENTLEY
ATTORNEY

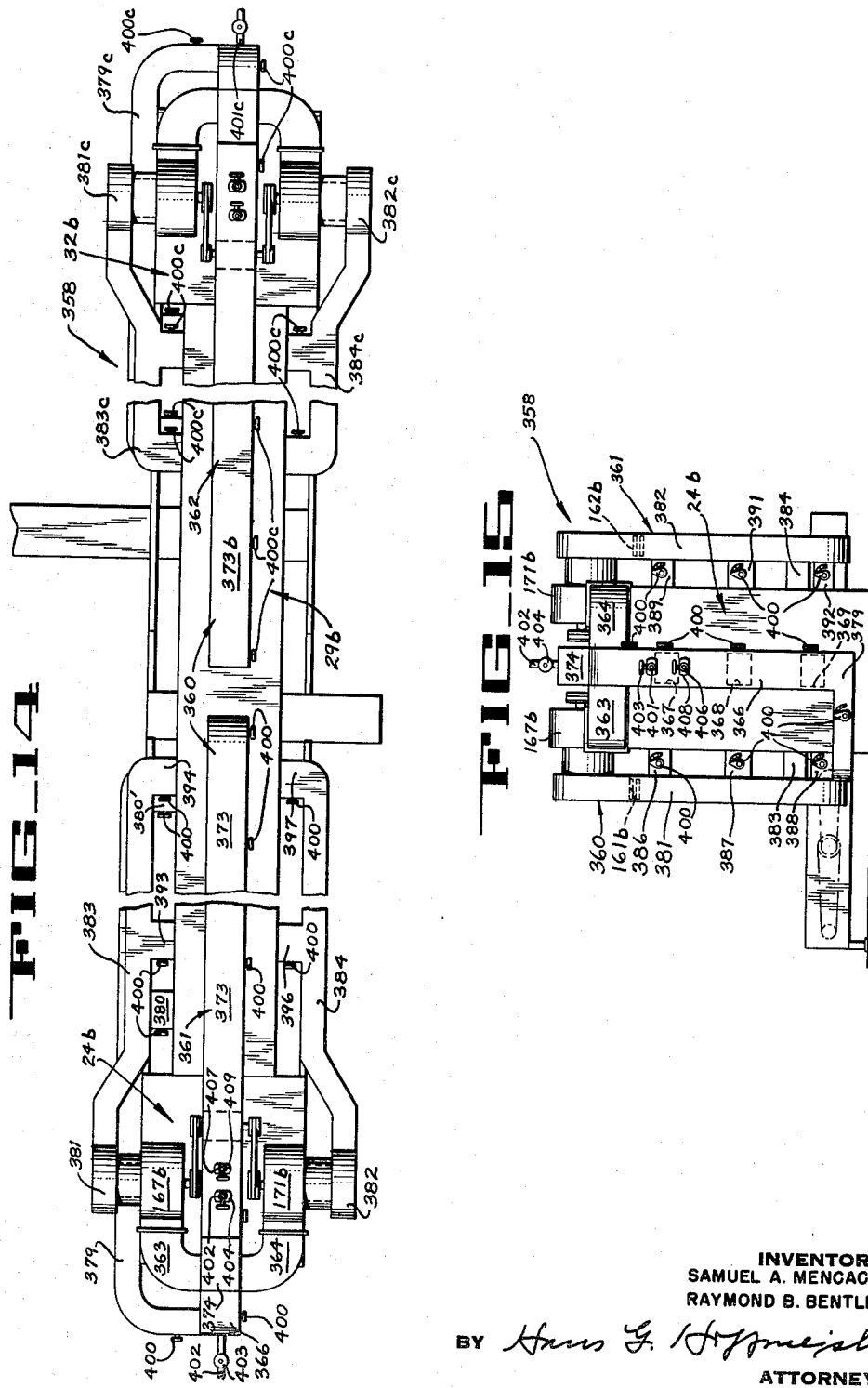

United States Patent Office 3,182,583
Patented May 11, 1965

3,182,583
APPARATUS FOR COOKING FISH
Samuel A. Mencacci, St. Nicolas-Waes, Belgium, and Raymond Beacher Bentley, Pacific Grove, Calif., assignors to International Machinery Corporation S.A., St. Nicolas-Waes, Belgium, a Belgian corporation
Filed Dec. 6, 1960, Ser. No. 74,201
19 Claims. (Cl. 99—260)

The present invention appertains to apparatus for cooking fish and more particularly relates to a versatile fish cooking apparatus which is capable of handling cans within a wide range of sizes and which is capable of applying and directing hot air, steam, and smoke selectively to the fish at a variety of different locations in the apparatus so as to adapt the apparatus to cook many different types of fish in many different ways to satisfy customer demands.

Fish cookers are presently being used in which conveyors are employed to carry cans of fish through a steam chest and through a warm air chest to cook the fish. These cookers are designed to handle cans of only one predetermined size and shape. The cans pass through the cooker before covers are applied thereon, and are usually supported in an inverted position on a basket which is provided with perforations or grills for supporting the fish in the inverted cans while permitting the juice and oil to drain from the cans.

It is well accepted that the use of both steam and hot air are needed to cook fish and it is well known that different types, of fish, and even the same type of fish from different locations, require different amounts of treatment from the steam and hot air for best results.

It is, therefore, one object of the present invention to provide a versatile fish cooking apparatus capable of handling cans of different sizes and capable of considerable variation in the application of steam and hot air to the fish.

Another object is to provide a fish cooking apparatus capable of continuously receiving cans of fish at random without requiring that the cans be placed in any specific pattern.

Another object is to provide a fish cooking apparatus arranged to direct smoke selectively into the steam chamber, the hot air chamber, or both chambers simultaneously.

Another object is to provide a can inverting mechanism arranged to receive cans in unassorted array and adapted to be automatically adjusted to handle cans of different height.

Another object is to provide improved means for mounting a draper chain whereby the draper chain will resiliently yield to aid in firmly supporting the containers as they are inverted by the inverting mechanism.

Another object is to provide a fish cooker arranged to return the cans to an upright position before completion of the heat treatment of the fish to thereby prevent the sticking of the fish to the draper chain.

These and other objects and advantages of the present invention will become apparent from the following description and the accompanying drawings, in which:

FIG. 1 is a fragmentary schematic side elevation, with parts broken away, of the fish cooking apparatus of the present invention.

FIG. 2 is a schematic end elevation of the apparatus of FIG. 1 showing the left end thereof, certain parts being removed.

FIG. 3 is an enlarged longitudinal vertical section taken along lines 3—3 of FIG. 2.

FIG. 4 is an enlarged transverse section taken along lines 4—4 of FIG. 1.

FIG. 5 is an enlarged fragmentary perspective showing the draper chain and its resilient mounting means.

FIG. 6 is an enlarged elevation of a portion of the apparatus taken looking in the direction of the arrows 6—6 of FIG. 4.

FIG. 7 is a vertical section taken along line 7—7 in FIG. 3.

FIG. 8 is a perspective of one of the chain conveyor shoes.

FIG. 9 is an enlarged vertical section taken along the lines 9—9 of FIG. 1.

FIG. 10 is an enlarged horizontal section taken along lines 10—10 of FIG. 1 and showing the feed and discharge conveyors of the fish cooking apparatus.

FIG. 11 is an enlarged section taken along lines 11—11 of FIG. 10.

FIG. 12 is a perspective of the steam, hot air, and smoke distribution system used with the fish cooking apparatus but shown separated from the apparatus.

FIG. 13 is a schematic side elevation, partially in section and partially broken away, of a modified form of the fish cooking apparatus of the present invention showing a different arrangement for the hot air, steam, and smoke distribution lines for more complete control of the hot air, steam and smoke.

FIG. 14 is a plan of the apparatus of FIG. 13, certain parts being broken away.

FIG. 15 is an elevation of the left end of the apparatus shown in FIG. 13.

The fish cooking machine 20 (FIGS. 1 and 2) of the present invention includes an endless belt type feed conveyor 21 which extends outwardly from one side of the machine intermediate its length. Cans of fish to be cooked and positioned on conveyor 21, either manually or by a supply mechanism, and the cans are advanced into the machine and transferred in random formation to a can inverting conveyor 22. The cans are carried by the inverting conveyor 22 through a generally horizontal hot air tunnel 23 and into a hot air chamber 24 having an inverting mechanism 27 therein which includes an inverting wheel 26, the conveyor 22, and a fish retaining conveyor belt 28. The cans are advanced between the inverting conveyor 22 and the fish retaining conveyor belt 28, both of which are trained around the wheel 26. The cans of fish emerge from the hot air chamber 24 in an inverted position with the fish resting on the surface of the conveyor belt 28 which is perforated to allow liquids to drain from the fish and from the cans. The conveyor belt 28 carries the inverted cans through a steam chamber 29 having an endless belt type hold-down conveyor 31 therein which contacts the closed ends of the inverted cans and prevents the cans from tipping and raising from the retaining conveyor 28. The cans are then advanced into a hot air chamber 32 in which is disposed a can-inverting mechanism 33 that is substantially the same as the inverting mechanism 27. The cans are received between the retaining conveyor 28 and an endless belt inverting conveyor 34, both of which are trained around a wheel 36 of the inverting mechanism 33 and serve to return the cans from an inverted to an upright position. The conveyor 34 carries the cans through a hot air tunnel 37 and onto a transverse discharge conveying assembly 38 (FIG. 2) which extends outwardly from the machine and discharges the cans with the cooked fish therein from the fish cooking machine 20.

More specifically, the fish cooking machine 20 comprises a rigid frame 46 upon which the several conveyors and chambers are supported. The inverting conveyor 22 is in the form of an endless chain belt that is trained around the inverting wheel 26 and around rollers 47 (FIG. 1) arranged in groups of three on shafts 48, 49, 51, 52 (FIG. 3) and shafts 53 and 54 (FIG. 1) which are mounted for rotation on the frame 46. The outer rollers 47 of each group of three rollers are provided with flanges 47a as indicated in the lower part of FIG. 4 so as to guide the conveyor 22, while each center roller 47' is provided with a cylindrical periphery. A one piece roller rather than three spaced rollers, may be carried by the shaft 49 and such a roller is shown in FIG. 3.

The shaft 49 is journalled in two arms 55 which are keyed to a shaft 56 that is journalled in suitable bearings on the frame 46. The arms 55 carry counterweights 57 which force the shaft 49 clockwise (FIG. 3) causing the roller 47 carried thereby to act as a take-up roller. The shaft 52 is journalled in the lower ends of vertically movable legs 58 and 58' (FIGS. 1 and 3) which are guided for vertical movement by the frame 46, and which are urged downwardly by springs 59 disposed between abutments on the frame and on legs. This arrangement permits automatic movement of the conveyor 22 toward or away from the wheel 26 when handling cans of different sizes.

The inverting conveyor 34 at the opposite end of the machine (FIG. 1) is similarly trained around the inverting wheel 36 and around groups of three rollers 60 on each of the shafts 61, 62, 63, 64, 65 and 66 which are journalled on the frame 46 in a manner identical to the corresponding shafts associated with the conveyor 22. The can supporting runs of the inverting conveyors 22 and 34 adjacent the feed conveyor 21 and adjacent discharge conveyor 38, respectively are additionally supported by rolls 68 keyed to shaft 69 journalled in the frame 46. The inverting conveyors 22 and 34 are of wire mesh construction so that hot air and steam can pass therethrough.

The fish retaining conveyor 28 includes a pair of parallel, spaced roller chains 71 (FIG. 4) which cooperate to support a draper 72 made up of a plurality of perforated links 73 best shown in FIG. 5. Spaced links of the draper 72 are resiliently connected to the adjacent chains 71 by pins 74 which extend through openings in certain of the links 73 and through openings in horizontal extensions of flanges 75 of certain of the connecting links 76 of the chains 71. An enlarged head 77 (FIG. 6) of each pin 74, and a washer 78 and cotter pin 79, cooperate to lock the draper 72 to the two roller chains 71. A compression spring 81 (FIG. 5) is positioned around each pin 74 between the associated link 73 and extension 75 and provides a resilient connection between the draper 72 and the roller chains 71.

The roller chains 71 of conveyor 28 are trained around the wheels 26 and 36 (FIG. 1) and around pairs of sprockets 82 secured to shafts 83, 84, 85, 86, 87, and 88 which are journalled on the frame 46. Each roller chain 71 is guided through the steam chamber 29 between angle members 91 and 92 (FIG. 4) secured, as by welding, to the side walls 93 of the chamber 29. The draper 72 is guided through the steam chamber 29 by three steam distribution tubes 94 of rectangular cross-section.

The can hold-down conveyor 31 is also of wire mesh construction and is trained around several rolls 101 (FIG. 1) in the upper portion of the steam chamber 29. The rolls 101 are keyed to shafts 102, 103, 104 and 105 which are journalled in bearings secured to the side walls 93 of the steam chamber 29. The shaft 104 (FIGS. 4 and 6) is journalled in arms 106 of a level adjusting device 107, which arms are rigidly interconnected by bar 108 welded to both arms. Each of the arms 106 is connected to a stub shaft 109 journalled in a bearing secured to the adjacent side wall 93 of the chamber 29. A lever 111, having a spring loaded detent 112 adjacent the free end thereof, is connected by a pin 113 to one of the stub shafts 109. As shown in FIG. 6 an arcuate locking plate 114 having holes 116 therein for receiving the detent 112 is welded to the wall 93 adjacent the arm 111.

In FIG. 1 the hold-down conveyor 31 is in position to handle short cans. If larger cans are to be processed by the fish cooking machine, the spring detent 112 is removed from its hole, the lever 111 is pivoted in a clockwise direction (FIG. 6), and the spring detent 112 is inserted into the appropriate hole 116 to lock the shaft 104 and supported roll 101 at the proper elevation for the particular size of cans being processed. A level adjusting device 117, which is similar to the device 107, is provided for mounting the shaft 105 in the steam chamber 29.

The steam chamber 29 extends for a considerable distance longitudinally of the machine and, as seen in FIG. 4, is of generally U-shaped cross-section having a sloping floor 121 connected to, or integral with, the side walls 93. Substantially U-shaped channels 122 are formed integrally with the walls 93 at the upper ends thereof and are arranged to receive the side flanges 123 of a plurality of removable covers 124 (FIGS. 1, 3 and 4). The covers 124 cooperate to form a roof for the steam chambers 29 and may be easily removed by means of handles 124' when it is desired to clean or make repairs to the steam chamber 29. Conduits 125 having valves 125' therein are provided in the end covers to vent steam therefrom. Several transversely extending angle members 126 (FIG. 4), having slots 126' therein to permit liquid to drain therepast along the floor 121, are provided to support the steam tubes 94. The floor 121 is sloped toward the hot air chamber 24 and the liquid collected on the floor flows into a trough 127 (FIG. 3) and thereafter into a tube 128 which discharges the liquid from the machine 20.

A baffle 129 (FIG. 3) is disposed between the steam chamber 29 and the hot air chamber 24 to substantially prevent the intermingling of steam and hot air. The baffle 129 includes a plate 129' which is secured to a bar 129" having a handle 131 thereon. The plate 129' extends through a slot in a transverse channel member 132 of the steam chamber 29 and is so arranged that the bar 129" rests against the bottom of the channel member 132 when the smallest size cans are being processed by the cooker. A vertical row of holes 133 (FIG. 4) is placed near each end of the plate 129' and the holes 133 are adapted to receive pins (not shown) which may be inserted in selected ones of the holes 133 and rest on the bottom of the channel 132 (FIG. 3) when taller cans are being processed by the cooker 20. A baffle 134 (FIG. 1), which is identical to the baffle 129, is disposed between the hot air chamber 32 and the steam chamber 29 and operates in the same way. Thus, in the embodiment of FIG. 1, the steam chamber 29 extends from baffle plate 129 to baffle plate 134.

The hot air tunnels 23 and 37 are of generally rectangular, tubular construction, as shown in FIG. 4, and each may be made of one piece or be fabricated of several pieces bolted together. Guide rails 136 and 137 extend longitudinally along each side of tunnel 23 and are welded to studs 138 which are bolted to and project inwardly from vertical side walls 139 and 140 of the tunnel 23. Similar guide rails (not shown) are disposed in the tunnel 37. A baffle 141 extends transversely across the tunnel 23 and is connected by bolts 142 to the roof 143 of the tunnel 23. The roof 143 is provided with longitudinal extending slots 144 (FIG. 4) so that the baffle 141 can be moved between a position at the far right end of the tunnel, adjacent a fixed baffle 145, indicated by the dotted lines in FIG. 1, and a position at the left end of the tunnel. As will presently be described, hot air flows from the hot air chamber 24 into the tunnel 23. Therefore, it will be apparent that the baffle 141 provides means for adjustably determining how much of the tunnel will be subjected to a hot air atmosphere and consequently how long the cans of fish will be moving through this hot air atmosphere. At the other end of the machine, a baffle 146, which is identical to the baffle 141 and is mounted in the tunnel 37 in the same way and for the same purpose.

The hot air chamber 24 and inverting mechanism 27 therein is substantially the same as the chamber 32 and inverting mechanism 33 therein, therefore only the chamber 24 and inverting mechanism 27 will be described in detail. Parts of the chamber 32 and mechanism 33 which are equivalent to parts of the chamber 24 and mechanism 27 will be assigned the same numerals followed by the suffix "a."

The hot air chamber 24 is enclosed by a front wall 151 (FIG. 3), a cover 152, a floor 153, side walls 154 and 156 (FIG. 1), and a rear wall 157 (FIG. 3) having a slot 158 therein through which the conveyor 28 travels, and an opening 159 therein which registers with the tunnel 23. The side walls 154 and 156 have openings therein which register with heat exchangers 161 and 162 (FIG. 2), respectively. The heat exchangers are connected to and communicate with vertically extending ducts 163 and 164, respectively. The upper end of the duct 163 is connected to the inlet end 166 of a blower 167, while the outlet 168 (FIG. 3) of the blower 167 communicates with an opening (not shown) in the cover 152. Similarly, the upper end of the duct 164 is connected to the inlet end 169 (FIG. 2) of a blower 171, and the outlet 172 of the blower 171 communicates with another opening (not shown) in the cover 152. The blowers 167 and 171 are mounted on the cover 152 and have shafts 173 and 174, respectively, which are connected together by a flexible coupling 176. A pulley 177 is keyed to the shaft 173 and is connected to a drive pulley 178 (FIG. 3) by a belt 179. The drive pulley 178 is keyed to the drive shaft 181 of a motor 182 which is mounted on a bracket 183, supported by the cover 152. When the motor 182 is operating, the blowers 167 and 171 circulate air through the hot air chamber 24 in the direction indicated by the arrows shown in FIG. 2.

The wheel 26 of the inverting mechanism 27 (FIGS. 3 and 7) comprises a transversely extending shaft 187 that is journalled in bearings 188 and 189 bolted to the frame 46. A pair of spaced sprockets 191 and 192 are keyed to the shaft 187 and have apertured discs 193 and 194, respectively, secured thereto and spaced outwardly therefrom by tubular spacers 195 and bolts 196. A plurality of transversely spaced chain supporting spiders 197 are formed on a common hub 198 which is secured to the shaft 187, and each spider includes radially extending legs 199, secured to the hub 198, and to an inner ring 201 and an outer ring 202. The roller chains 71 of the fish retaining conveyor 28 are in driving engagement with the sprockets 191 and 192 while the draper 72 rides along and is supported by the outer rings 202, when cans of fish are being moved through the inverting mechanism 27 and is slightly spaced from the outer ring 202 when no cans are present. As shown in FIG. 7, the inverting conveyor 22 is wider than the fish retaining conveyor 28. Consequently, each side of the inverting conveyor 22 is trained around four arcuate shoes 203 (FIGS. 7 and 8). The four shoes are disposed in a circular pattern at 90 degree intervals to provide a fragmentary support ring. Each shoe 203 is adjustably mounted for radial movement on its associated disc 193 or 194 by means of bolts 204 which extend through slots 206 (FIG. 3) in the associated disc and permits radial movement of the shoes 203. Thus, the shoes 203 are secured in the position shown in FIGS. 3 and 7 when short cans are being processed, and are moved radially outward and secured to the outer ends of the slots 206 when taller cans, for example 5" cans, are being processed. It will be recognized that the shoes 203 and cans engaged between the conveyors 22 and 28 provide the drive for the inverting conveyor 22.

Since the fish and fish oils come into direct contact with the fish retaining conveyor 28, it is necessary to continuously clean this conveyor while the cooker 22 is in operation. For this purpose, a wash tank 211 (FIGS. 1 and 9) is mounted on the frame 46 near the discharge conveyor 38 of the fish cooking machine. As shown in FIG. 1, the shaft 83 and the sprockets 82 on the shaft are disposed in the tank 211 and consequently cause the conveyor 28 to dip into water or any other suitable cleaning liquid contained in the tank 211. A brush 212 (FIG. 9) is locked on a shaft 213 which is journalled in sealed bearings 214 and 216 bolted in the tank 211, and is disposed in position to engage the fish-contacting surface of the conveyor 28. The shaft 213 extends through one wall of the tank 211 and is connected to the drive shaft 217 of a motor 218 by a flexible coupling 219. The motor 218 is bolted to a bracket which is secured to the frame 46. The cleaning liquid enters the tank 211 through a conduit 221 having a valve 222 therein, and is discharged from the tank by any suitable means such as an overflow (not shown). The liquid is heated by structure which will be described presently.

As mentioned previously, the conveyor 28 (FIG. 1) drives the inverting mechanism 27 and 33, and the inverting mechanisms 27 and 33 drive the inverting conveyors 22 and 34, respectively. The drive for the conveyor 28 comprises a variable speed motor 226 which is connected to a gear box 227 by a belt drive 228. A sprocket 229 keyed to the output shaft 231 of the gear box 227 drives a chain 232 which is trained over an idler sprocket 234 and over a sprocket 233 which is keyed to the shaft 83 that drives the conveyor belt 28. The idler sprocket 234 is keyed to a shaft 236 which is suitably journalled on the frame 46. The hold-down conveyor 31 is driven by a chain drive 237 (FIG. 1) connected between the shafts 87 and 102.

The feed conveyor assembly 21 (FIGS. 1 and 10) and discharge conveyor assembly 38 are arranged, respectively, to feed cans from the packing station onto the inverting conveyor 22 in a random formation and to receive the processed cans from the inverting conveyor 34 in a random formation and discharge them from the machine.

The feed conveyor assembly 21 (FIG. 10) comprises a link conveyor 241 which is trained over sprocket (not shown) mounted on shafts 242 and 243 suitably journalled on the frame 46. The upper run of the conveyor 241 is driven in the direction of arrow A (FIG. 10) by a variable speed motor 244 which is shown in phantom lines being disposed above the link conveyor 241. The motor 244 is in direct alignment with and is hidden by the motor 226 (FIG. 1) and has a drive shaft 245 projecting therefrom. A sprocket 246 keyed on the shaft 245 is connected by a chain 249 in driving engagement with a sprocket 247 keyed on an elongated line shaft 248 (FIG. 10). The line shaft 248 is journalled on the frame 46 and has a sprocket 250 keyed thereto and connected by a chain 252 to a sprocket 251 keyed on the shaft 243.

An extension of the guide rail 137 is curved over the link conveyor 241 and serves to deflect cans from the link conveyor 241 onto the inverting conveyor 22. Similarly, the guide rail 136 has a curved extension 253 which co-operates with parallel rails 254 at the inlet end of the link conveyor 241 to guide cans along the conveyor 241. A deflecting arm 255 projects across the conveyor 241 and is mounted for pivotal movement by a pin 256. A spring 257 connected between one end of the arm 255 and a bracket 258 fixed to the frame 46 resiliently urges the arm 255 to can-deflecting position across the conveyor 241. It will be understood that, when cans on the conveyor 241 are held from being discharged therefrom by cans already on the conveyor 22, the spring 257 will allow the arm 255 to pivot in a clockwise direction (FIG. 10) about the pin 256 and permit the cans to advance along the conveyor 241 until they reach the extension of the guide rail 137 and are deflected onto the conveyor 22 or until they enter the conveyor 22 at a point not already loaded with cans.

The discharge conveyor assembly 38 is composed of three parallel link conveyors 266, 267 and 268 all driven at different speeds. The shortest conveyor 266 is trained around sprockets (not shown) mounted on shafts 269 and 271 journalled on the frame 46. A sprocket 272 keyed on the shaft 271 is connected by a chain 274 to a sprocket 273 keyed on the line shaft 248. The sprockets are so chosen that the conveyor 266 is driven at a relatively slow speed. The intermediate conveyor 267 is trained around sprockets (not shown) mounted on the shaft 269 and on a shaft 276. A chain 277 interconnects sprockets 278 and 279 keyed to the shafts 271 and 276, respectively, and drives the conveyor 267 faster than the conveyor 266. Similarly, the longest conveyor 268 is trained around sprockets (not shown) on the shaft 269 and on a shaft 281. A chain 282 interconnects sprockets 283 and 284 keyed to the shafts 276 and 281 and are arranged to drive the conveyor 268 at a higher speed than the conveyor 267.

A guide rail 288 is secured to the frame 46 and is disposed alongside the conveyor 268 to prevent the cans from being discharged laterally from the conveyor 268. A guide rail 289 is secured to the frame 46 and is angled across the conveyors 266 and 267 to deflect the cans into an orienting and singulating device 291 (FIGS. 10 and 11).

The singulating device 291 comprises a pair of gear housings 292 and 293 which are bolted to a channel frame member 294 extending transversely across the conveyor assembly 38. A shaft 296 extends through and is journalled in the gear housings 292 and 293. Bevel gears 297 and 298 (FIG. 11) are locked on the shaft 296 and mesh with bevel gears 299 and 301, respectively. The gears 299 and 301 are keyed on vertical shafts 302 and 303, respectively, which shafts 302 and 303 are journalled in the gear boxes 292 and 293, respectively. Singulating wheels 304 and 306, having resilient can contacting surfaces, are keyed to the lower ends of the shafts 302 and 303, respectively, and are disposed in position to contact cans which are not in exact alignment with the link conveyor 268 to shift the cans into alignment with the conveyor 268. A sprocket 307 (FIG. 10) on the shaft 296 and a sprocket 308 on the shaft 276 are connected by a chain 309 which drives the wheels 304 and 306 in the direction of the arrows C in FIG. 11. The singulating device 291 is especially useful for aligning rectangular cans since, whenever an unaligned rectangular can is moved by the conveyors 267 or 268 against one of the wheels 304 and 306, it is shifted by the wheels until it passes between the wheels with the long axis of the can aligned with the conveyor 268. The cans are then guided along the conveyor 268 by the rail 288 and by a short rail 310 having a curved end 311 disposed adjacent the wheel 306.

The steam air and smoke distribution system 316 is best shown in FIG. 12. Steam enters the system 316 by means of a main conduit 317 which is connected to any suitable source of steam (not shown). A main valve 318 is provided in the main conduit 317 to control the steam flow thereto. A branched conduit 319, having a valve 321 and an automatic temperature regulator 322, directs steam from the main conduit 317 to upturned branch end members 319a which, as seen in FIG. 4, communicate with the three steam distribution tubes 94. The tubes are provided with apertures 323 for releasing steam into the steam chamber 29. A conduit 324 (FIG. 12), having a valve 325 and an automatic temperature regulator 326 therein, is connected to the heat exchangers 161 and 162 of the hot air system to supply heat thereto. Similarly, a conduit 327, having a valve 328 and an automatic temperature regulator 329 therein, is connected to the heat exchangers 161a and 162a. A conduit 331 having a valve 332 therein is connected to the main conduit 317 and is arranged to direct steam into the wash tank 211 (FIG. 1) to heat the water therein. A steam and condensate outlet 333 is connected to the four heat exchangers by conduits 334 and 336 and assures a circulation of steam through the heat exchangers in the usual manner.

A conventional smoke generator 341 is included in the distribution system 316 and includes a main supply conduit 342 having valves 343 and 344 therein. A conduit 346 under control of the valve 343 is connected to the main conduit 342 and to the ducts 163 and 164. A similar conduit 347 which is controlled by the valve 344 is connected between the main smoke conduit 342 and the ducts 163a and 164a. A conduit 348, having a valve 349 therein, is connected between the main smoke conduit 342 and the steam conduit 319. Thus, by proper control of the valves 343, 344 and 349, smoke may be directed into the steam chamber 29 (FIG. 1) either alone or when mixed with the steam, and, smoke may be directed into either or both of the hot air chambers 24 and 32.

In the operation of the fish cooking apparatus 20 (FIG. 1) of the present invention, the motor 244 (FIG. 10) is started to drive the feed conveyor 241 and the discharge conveyors 266, 267 and 268 in the direction indicated by the arrows A and B, (FIG. 10). The motor 226 (FIG. 1) is started to continuously drive the inverting conveyors 22 and 34, the retaining conveyor 28, the hold-down conveyor 31, and the inverting wheels 26 and 36 in the directions indicated by the arrows in FIG. 1. The motor 218 (FIG. 9) is started to rotate the brush 212 which cleans the draper 72. Also, the motors 182 (FIG. 1) and 182a are started, causing the blowers 167 and 171 (FIG. 2) at one end of the machine and corresponding blowers 171a (FIG. 1) and 170a (not shown) at the other end of the machine to direct air through the hot air chambers 24 and 32 in the direction indicated by the arrows in FIG. 2.

Cans, which have been packed with fish and which are not covered, are directed onto the feed conveyor 241 (FIG. 10) in any order and are carried by the conveyor 241 against the deflector arm 255 which initially deflects the cans onto the inverting conveyor 22 adjacent the rail 136. The spring 257 (FIG. 10) allows the arm 255 to pivot in a clockwise direction as the conveyor 22 becomes filled with cans so that certain of the cans will be deflected by the rail 137 onto the conveyor 22 while other cans are deflected by the arm 255 onto the conveyor to evenly distribute the cans over the conveyor 22.

The cans of fish are then advanced by the conveyor through the tunnel 23 (FIGS. 1 and 3) and into the hot air chamber 24. While in the chamber 24, the cans move between the draper 72 and the conveyor belt 22, causing the springs 81 (FIG. 5) to deflect slightly, permitting the draper 72 to move inwardly and the counterweight 57 and springs 59 to deflect and permit the rollers 47 controlled thereby to move upwardly. In this way, the cans are firmly clamped between the draper 72 and the conveyer belt 22. If a great change is to be made in can sizes, for example when 5″ cans are to be processed and the machine is set to handle ½″ cans, the shoes 203 (FIGS. 3 and 8) are moved radially outward to the full extent of the slots 206 and are locked in place by the bolts 204 (FIG. 7).

As the cans move around the inverting wheel 26 (FIG. 3), they are inverted and are advanced into the steam chamber 29 at which time they are treated with steam. While in the steam chamber 29, the lower run of the hold-down conveyor 31 rests on the bottoms of the inverted cans and prevents them from raising or overturning on the draper 72. When tall cans are being processed, the shaft 104 and the roller 101 thereon are raised and locked in the proper position by the mechanism shown in FIG. 6 wherein the pin 112 is inserted in the proper hole 116 for the particular size of cans being processed. The shaft 105 is raised in the same manner by the device 117 (FIG. 1). It is also to be noted that the shaft 48 (FIG. 3) may be raised to accommodate larger cans by raising angle members 351 (FIGS. 3 and 7) upon which the shaft is journalled by means of bolts 352 which extend through elongated slots 353.

The cans are then directed into the hot air chamber 32 where the cans are returned to an open-end up or upright position by the inverting mechanism 33. The cans are then passed into and through the hot air tunnel 37 and onto the low speed conveyor 266, (FIG. 10), of the discharge conveyor assembly 38. The conveyor 266 is moving at a relatively slow speed so that the cans will not be too abruptly moved laterally from the conveyor 34 which might result in overturning the cans. The cans on the conveyor 266 are then moved onto the intermediate speed conveyor 267 by the guide rail 289 and by other cans attempting to move from the inverting conveyor 34 onto the low speed conveyor 266. The cans are transferred from the intermediate speed conveyor 267 to the high speed conveyor 268 into the same way and are then moved through the singulating device 291 and discharged from the fish cooking apparatus 20.

As has already been mentioned, the fish cooking apparatus of the present invention is a versatile apparatus adaptable to operate under considerably different requirements of hot air, smoke and steam. One set of conditions for cooking fish is as follows: The fish is pre-dried by hot air which is circulated at the rate of 3000 cubic feet per minute through the hot air chamber 24 and through the steam heated heat exchangers 161 and 162 where it is heated to 90° F. The position of the baffle 141 (FIG. 1) in the hot air tunnel 23 determines how much of t he tunnel 23 is heated to 90° F. As the inverted cans are passed through the steam chamber 29, they are cooked with steam to 200° F. and are drained while being cooked. The cans of fish are then transferred into the hot air chamber 32 where they are pre-baked with 3000 cubic feet per minute of hot air at 140° F. It will be understood that the temperatures are maintained automatically by the temperature regulators 322, 326 and 329 (FIG. 12). Smoke may be added as desired by manual control of the valves 343, 344 and 349 to the hot air chambers 24, 32 and steam chamber 29 either independently together.

From the foregoing description it is apparent that the fish cooking apparatus of the present invention is very versatile in that the apparatus is arranged to handle cans which are between approximately ½ to 5" in height. The inverting mechanism is adapted to automatically handle cans having height variations of approximately 2½" without requiring time consuming mechanical adjustments. The fish cooking apparatus is also adapted to handle cans at random without requiring that the cans be positioned in any specific can pattern.

The modified fish cooking apparatus 358, shown schematically in FIGS. 13, 14 and 15, is substantially the same as the apparatus 20 and differs primarily in that a more versatile steam, air, and smoke distribution system 360 is employed. Therefore, only the distribution system 360 will be described in detail, and those parts of the apparatus 358 which are equivalent to parts of the machine 20 will be indicated by the same reference numerals used in machine 20 followed by the suffix "b."

The distribution system 360 may be considered to be divided into a front half 361 and a rear half 362. The front half 361 comprises duct elbows 363 and 364 (FIG. 14) which are connected to the discharge end of the blowers 167b and 171b, respectively, and to a vertical pressure duct 366 (FIG. 13). Three discharge conduits 367, 368 and 369 communicate with the duct 366 and with the hot air chamber 24b at points above, between, and below baffles 371 and 372 in the chamber 24b, respectively. A horizontal pressure duct 373 extends rearwardly over the steam chamber 29b and is connected to the vertical duct 366 by a transition section 374. Discharge ducts 376, 377 and 378 connected the horizontal pressure duct 373 to the steam chamber at three longitudinally spaced points. A side pressure duct 379 communicates with the lower end of the vertical pressure duct 366 and discharge ducts 380 and 380' are connected to the hot air tunnel 23b.

The inlet ends of the blowers 167b and 171b (FIGS. 14 and 15) are connected to vertical suction ducts 381 and 382 which are connected at their lower ends to horizontal suction ducts 383 and 384, respectively. Conduits 386, 387 and 388 are connected between the vertical suction duct 381 and the hot air chamber 24b at points above, between, and below the baffles 371 and 372, respectively. Similarly, conduits 389, 391 and 392 (FIG. 15) are connected between the vertical suction duct 382 and the hot air chamber 24b at points above, between and below the baffles 371 and 372 (FIG. 13), respectively. Conduits 393 and 394 (FIG. 14) are connected between the horizontal suction duct 383 and the hot air tunnel 23b at points spaced longitudinally therealong. Similarly, conduits 396 and 397 are connected between the horizontal suction duct 384 and the hot air tunnel 23b at points spaced longitudinally therealong. Each of the conduits, the upper end of the vertical pressure duct 366, the inlet end of the side pressure duct 379, and the forward end of the horizontal pressure duct 373 are provided with valves 400 which can be manually controlled and locked in open, closed or intermediate positions.

Steam conduits 401 and 402 having valves 403 and 404 therein, respectively, communicate with a source of steam and with the vertical pressure duct 366 and horizonntal pressure duct 373, respectively. Conduits 406 and 407, having valves 408 and 409 therein, respectively, communicate with a source of smoke and with the vertical pressure duct 366 and horizontal duct 373, respectively. The hold-down conveyor which is used in the first embodiment of the invention may be used in the modified machine 358. However, in FIGS. 13–14 an arrangement, in which this conveyor is not used, is illustrated. Baffles 411 and 411c (FIG. 13), which are similar in design to the baffle 129 (FIG. 3), may be used to divide the steam chamber 29b into a number of smaller chambers. The baffles 411 and 411c are placed in the chamber 29b between adjacent discharge conduits of the pressure ducts 373 and 373b. The baffles 411 and 411c may be adjusted in a manner similar to the baffles 129 or may be removed entirely from the steam chamber 29b.

The rear half 362 of the distribution system 360 is provided to control the processing within the hot air chamber 32b, the hot air tunnel 37b, and the discharge half of the steam chamber 29b. Since the rear half 362 of the distribution system 360 is very similar to the front half 361, equivalent parts will be assigned the same numerals followed by the suffix "c."

The operation of the mechanical components, such as conveyors, of the fish cooking apparatus 358 is the same as that of the machine 20 and will not be repeated. Since the different valves 400c of the rear half 362 of the steam, air and smoke distribution system 360 may be individually controlled in a manner similar to that of the front half 361, only the operation of the front half 361 will be described in detail.

With the valves 400 (FIG. 13) in the vertical pressure duct 366 and in the horizontal pressure duct 373 in closed position, hot air is prevented from entering any of the chambers. Steam and smoke may then be directed individually or together into the steam chamber 29b by opening any or all of the valves 400 in the ports 376, 377 and 378. The baffles 411 serve to prevent the flow of steam into those parts of the chamber 29b where steam is not desired. The amount of steam and/or smoke entering the steam chamber 29b can be controlled by the valves 404 and 409. It is to be understood that the temperature of the steam entering the system through the conduits 401 and 402, as well as the temperature of the steam entering the heat exchangers 161b, may be controlled by an automatic temperature regulator (not shown). Likewise, steam and smoke from the conduits 401 and 406 may also be directed into the hot air chamber 24b and into the hot air tunnel 23b when any one or all of the valves 400 in the ports 367, 368, 369, 380 and 380' are opened. Thus, the distribution system 360 makes it possible to use the apparatus 358 as a steam cooker with or without smoke.

If the valve 400 in the vertical pressure duct 366 is open, and the valves in the ducts 367 and 369 are open, hot air will be directed into the hot air chamber 24b above the baffle 371 and below the baffle 372. The space between the baffles 371 and 372 will be a dead space since the valve 400 in the port 368 is closed. If it is desired that the hot air flow to the end of the hot air tunnel 23b, the valves in the suction conduits 394 and 397 (FIG. 14) are opened and the valves in the conduits 393, 396, 386 (FIG. 15), 387, 388, 389, 391 and 392 are closed. Thus, the air returns to the blowers through the suction ducts 383, 381 and 384, 382. If it is desired to direct heat into the tunnel 23b, but not below the baffle 371 in the hot air chamber 24b, the above settings are maintained except that the valve in the conduit 369 is closed and the valves in the side pressure duct and in the conduits 380 and 380' are opened. If it is desired that the hot air enters the tunnel no further than the conduits 393 and 396, the valves in these conduits are opened and the valve in the pressure conduit 380' is closed. If it is desired to prevent hot air from entering the hot air tunnel 23b, the valves 400 in the conduits 388 (FIG. 15) and 392 are opened and the valve in the side pressure duct 379 is closed.

If it is desired to direct hot air into the hot air chamber 24b only in the space below the baffle 372, the valves in the ports 367 and 368 are closed and the valves in the ducts 369, 388 and 392 (FIG. 15) are opened.

It is also apparent that hot air may be directed into the steam chamber by opening the valve 400 in the horizontal pressure duct 373 (FIG. 13) and by opening any one or all of the valves in the conduits 376, 377 and 378. The air returns to the blowers through the steam chamber 29b, conduits 386 and 389, and ducts 381 and 382. Steam or smoke may also be introduced into the air steam when desired.

The above examples of valve settings have been included herein to indicate the many different locations at which hot air, steam and smoke may be introduced and withdrawn from the machine 358.

A fish cooking cycle which has been used successfully on sardines is as follows. The fish enters the machine 358 (FIG. 13) and travels between points E and F in an atmosphere of hot air which preheats and dries the fish and also toughens the fish skin. The fish is then passed between points F and G which is a neutral zone and has no cooking medium therein. From point G to point H the fish moves in an atmosphere of steam which cooks the fish. The space between the points H and I is a second neutral zone. Steam is not desired past the point H since it would cause steam to become trapped in the inverted cans, and this steam would condense therein when the cans were returned to an upright position and cooled. If hot air was added before the point I is reached, the fish would be apt to stick to the conveyor 28b. The zone between points I and J may be considered to be an extended neutral zone. Oil may be applied to the fish betwen points I and J in a well known manner so that the fish will be given a fried look upon further hot air treatment. Hot air is applied between the points J and K for evaporating any excess moisture from the fish and for frying the fish if oil has been applied.

It is to be understood that smoke can be applied to any of the above mentioned zones to give a smoked flavor to the fish and that the speed of the several conveyors may be varied by means of their variable speed drive motors in order to control the cooking time. Selective manipulation of the many valves 400 also controls the cooking time since, in effect, the length and the location of the several chambers are varied by different settings of these valves. It will be also be apparent that the cooking time is directly proportional to the size of the cans being processed by the machine. In the present machine, such an increased cooking time can be obtained merely by changing the speed of the belts.

From the foregoing description and examples of operational settings, it is apparent that the modified fish cooking apparatus has a steam, air, and smoke distribution system which is arranged to control the flow of these gases into the several processing chambers in a variety of different ways and in a variety of different combinations thereby adapting the fish cooking apparatus for use with many different types of fish. Further, it will be recognized that various fish cooking processes can be followed due to the fact that the speed of the conveyor belts may be changed, the lengths of the various chambers may be changed, and the position of the chambers may be varied.

While two embodiments of the present invention have been shown and described, it will be understood that various other changes and modifications may be made without departing from the spirit of the invention or the scope the appended claims.

Having thus described the present invention and the manner in which the same is to be used, what is claimed as new and desired to be protected by Letters Patent is:

1. A fish cooker comprising a support structure, means providing a fish processing chamber on said structure, a first conveyor belt adapted to receive upright open-top cans of raw fish, and an inverting mechanism between said chamber and said conveyor for inverting the cans prior to entry into said chamber, said inverting mechanism including a drum-like wheel, a second conveying belt trained around said wheel and having a fish-cans supporting run movable through said chamber, said first conveyor belt having a run disposed around the wheel-encircling portion said second belt whereby cans on said first conveying belt will be clamped between said belts as the cans are conveyed around said wheel and inverted, and self-adjusting belt tightening means comprising rollers bearing upon said first conveyor belt at spaced points, and being yieldably mounted, for permitting said belt to adjust its position relative to said second conveyor belt in accordance with the height of the cans clamped therebetween.

2. A fish cooker comprising a support structure, means providing a plurality of consecutive fish processing chambers on said structure, a conveyor for carrying open-top cans of fish consecutively through said chambers, and means for selectively directing steam or a hot gas into each chamber whereby the order in which fish in said cans may be subjected to said steam and hot gas may be varied to conform to different cooking procedures.

3. A fish cooker comprising a support structure, means providing a plurality of consecutive fish processing chambers on said structure, a conveyor for carrying open-top cans of fish consecutively through said chambers, means for varying the speed of said conveyor, means for selectively directing steam or a hot gas into each chamber, and means for varying the effective length of the portion of each chamber containing one of said heated mediums whereby the length of time the fish is subjected to the heated mediums may be varied by changing the speed of said conveyor or changing the effective lengths of said chambers and the order in which the fish is subjected to steam or hot gas may be varied by changing the heated medium that is directed to the chambers.

4. A fish cooker comprising means providing a steam chamber and a hot gas chamber, conveying means having a first perforated fish retaining belt section movable through said steam chamber and a second perforated belt section movable through said hot air chamber, means for positioning open cans of fish on said first belt section with the open side of the cans facing said belt section and the fish in contact with and retained by said first belt section, means for inverting the cans and guiding them onto said second belt section with the open side of the cans facing away from said second belt section and the fish spaced from said second belt section, means for directing steam into said steam chamber and into the open side of the can to cook the fish, and means for directing heated gas into said hot gas chamber to complete cooking of the fish and to evaporate residual steam in the inverted cans after the fish has been moved out of contact with said first belt section.

5. A fish cooker comprising, a support structure, a drum-like wheel journalled on said support structure, a cooking chamber connected to said support structure and disposed adjacent said wheel, a fish retaining conveyor trained in driving engagement around said wheel and extending through said cooking chamber, a second conveyor trained in driven engagement around said wheel and around said fish retaining conveyor, means for directing open-top fish-filled cans in upright position onto said second conveyor, means connected to said fish retaining conveyor to drive said conveyors and to advance the cans between said conveyors whereby said cans are inverted and deposited in inverted position on said fish retaining conveyor for movement through said chamber, and means comprising rollers bearing upon said second conveyor at spaced points, and being yieldably mounted, to allow that portion of the second conveyor that is trained around said wheel to move radially relative to said wheel so that cans of different heights can be clamped between said conveyors.

6. A fish cooking apparatus comprising a pair of hot air chambers, a steam chamber disposed between said hot air chambers, means defining a passage between said steam chamber and each of said hot air chambers, inverting means disposed in each hot air chamber and including a perforated fish retaining conveyor movable through said passages and through said hot air chambers and said steam chamber, means for driving said fish retaining conveyor, and means for directing open-topped cans of fish into one of said inverting means, said one inverting means being operable for inverting said cans and for releasing the cans in inverted position on said fish retaining conveyor for movement through said steam chamber and into the other inverting means to return the cans to an upright position.

7. A fish cooking apparatus comprising a pair of hot air chambers, a steam chamber disposed between said hot air chambers, an inverting wheel mounted for rotation in each hot air chamber, a perforated fish retaining conveyor trained in driving relation around said wheels and extending through said hot air chambers and through said steam chamber, a perforated inverting conveyor in each hot air chamber and having a portion thereof trained in driven engagement around the wheel and disposed around the portion of said fish retaining conveyor in the associated hot air chamber, means connected to said fish retaining conveyor for driving said fish retaining conveyor, means for circulating hot air in said hot air chambers, means for directing steam into said steam chamber, and means for directing open-topped cans of fish in random formation onto one of said inverting conveyors for movement thereby into clamped engagement between said one inverting conveyor and said fish retaining conveyor, said one conveyor cooperating with said fish retaining conveyor upon movement around the associated wheel to invert the cans and to release the cans in inverted position upon said fish retaining conveyor for movement through said steam chamber and into gripping engagement with said other inverting conveyor whereby the cans are returned to an upright position.

8. A fish cooking apparatus comprising a pair of hot air chambers, a steam chamber disposed between said hot air chambers and communicating therewith, an inverting wheel mounted for rotation in each hot air chamber, a pair of parallel endless chains trained in driving engagement around said wheels and extending through said hot air chambers and said steam chamber, a perforated fish retaining draper carried by and extending between said chains, resilient means connecting said draper to said chains, a perforated inverting conveyor in each hot air chamber and having a portion thereof trained in driven engagement around the wheel and around the portion of said fish retaining draper in the associated hot air chamber, means connected to said chains for driving said fish retaining draper, and means for directing open-topped cans of different height in random formation onto one of said inverting conveyors for movement thereby into resilient clamping engagement between said one inverting conveyor and said fish retaining draper, said one conveyor cooperating with said fish retaining draper upon movement around the associated wheel to invert the cans and to release the cans in an inverted position upon said fish retaining draper for movement through said steam chamber and into resilient engagement with said other inverting conveyor, said resiliently mounted draper adapted to move radially relative to each wheel and cooperating with the associated inverting conveyor to handle cans of various heights.

9. A fish cooking apparatus comprising a pair of hot air chambers, a steam chamber disposed between said hot air chambers, an inverting wheel mounted for rotation in each hot air chamber, a pair of parallel endless chains trained in driving engagement around said wheels and extending through said hot air chambers and said steam chamber, a fish retaining draper carrier by and extending between said chains, resilient means connecting said draper to said chains, an inverting conveyor in each hot air chamber and having a portion thereof trained in driven engagement around the wheel and around the portion of said fish retaining draper in the associated hot air chamber, means connected to each conveyor to allow said conveyor to be moved toward or away from the associated wheel in accordance with the size of the cans being advanced between said conveyor and said draper, means connected to said chains for driving said fish retaining draper, and means for directing open-topped cans onto one of said inverting conveyors for movement thereby into resilient clamped engagement between said one inverting conveyor and said fish retaining draper, said one conveyor cooperating with said fish retaining draper upon movement around the associated wheel to invert the cans and to release the cans in an inverted position upon said fish retaining draper for movement through said steam chamber and into engagement with said other inverting conveyor.

10. A fish cooking apparatus comprising a pair of hot air chambers, a steam chamber disposed between said hot air chambers and communicating therewith adjacent the upper end thereof, a hot air trunnel connected to each hot air chamber adjacent the lower end thereof, means for receiving open-topped fish-filled cans in random formation and for continuously advancing the cans through said hot air tunnels, hot air chambers, and steam chamber, means in one of said hot air chambers for inverting said cans causing said cans to be carried through said steam chambers in an inverted position, means in the other of said hot air chambers for returning said cans to an upright position while said fish is being subjected to hot air treatment, means for directing steam into said steam chamber and for controlling the temperature thereof, means for circulating hot air through said hot air chambers and said hot air tunnels, and means for controlling the temperature thereof.

11. A fish cooking apparatus comprising a pair of vertically elongated first heat treatment chambers, a second heat treatment chamber disposed between and connected to said first chambers and communicating therewith adjacent the upper end thereof, a heat treatment tunnel connected to each of said first heat treatment chambers adjacent the lower end thereof, means for receiving open-topped, fish-filled cans in random formation and for continuously advancing the cans through said tunnels, first heat treatment chambers, and second heat treatment chamber, independently adjustable means for directing steam into selected ones of said chambers and tunnels, and means for circulating hot air through selected ones of said chambers and tunnels and through selected portions of the selected chambers and tunnels to subject the fish to selectively varying amounts of hot air.

12. A fish cooking apparatus comprising a pair of first heat treatment chambers, a second heat treatment chamber disposed between said first chambers and communicating therewith adjacent the upper end thereof, a heat treatment tunnel connected to each of said first heat treatment chambers adjacent the lower end thereof, means for receiving open-topped, fish-filled cans in random formation and for continuously advancing the cans through said tunnels, first heat treatment chambers, and second heat treatment chamber, independently adjustable means for directing smoke into selected ones of said chambers and tunnels, independently adjustable means for directing steam into selected ones of said chambers and tunnels, and independently adjustable means for circulating hot air through selected ones of said chambers and tunnels and through selected portions of the selected chambers and tunnels to subject the fish to selectively varying amounts of hot air.

13. A fish cooking apparatus comprising a pair of vertically elongated hot air chambers, a steam chamber connected to and disposed between said hot air chambers and communicating therewith adjacent the upper end thereof, a hot air tunnel connected to each hot air chamber adjacent the lower end thereof, means for receiving open-topped, fish-filled cans in random formation and for continuously advancing the cans through said hot air tunnels, hot air chambers, and steam chamber, means in one of said hot air chambers for inverting said cans causing said cans to be carried through said steam chamber in an inverted position, means in the other of said hot air chambers for returning the cans to an upright position prior to completing the heat treatment of the fish, independently adjustable means for directing smoke into any of said chambers and tunnels, independently adjustable means for directing steam into any of said chambers and tunnels, and independently adjustable means for circulating hot air through selected portions of said hot air chambers, steam chamber, and tunnels to subject the fish to selectively varying amounts of hot air, the final heat treatment of the upright cans being adapted to evaporate moisture collected in the cans.

14. A fish cooking apparatus comprising a pair of vertically elongated hot air chambers, an elongated steam chamber disposed between and connected to said hot air chambers and communicating therewith adjacent the upper end thereof, a hot air tunnel connected to each hot air chamber adjacent the lower end thereof, means for receiving open-topped fish-filled cans in random formation and for continuously advancing the cans through said hot air tunnels, hot air chambers, and steam chamber, means in one of said hot air chambers for inverting said cans causing said cans to be carried through said steam chamber in an inverted position, means in the other of said hot air chambers for returning the cans to an upright position prior to the completion of the hot air treatment, a driven blower having an inlet end and an outlet end mounted adjacent one of said hot air chambers, a pressure duct communicating with said outlet end of said blower and having a plurality of ports communicating with said steam chamber at longitudinally spaced intervals and having a plurality of vertically spaced ports connected to said hot air chamber, a main valve in said pressure duct disposed between said outlet end of said blower and said ports that are in communication with said steam chamber, a second main valve in said pressure duct disposed between said outlet end of said blower and said ports that are connected to said hot air chamber, a suction duct communicating with the inlet end of said blower and having a plurality of spaced suction ports communicating with said hot air chamber and with said adjacent tunnel, a valve in each of said suction and pressure ports, valved steam conduits communicating with said duct at points downstream of both of said main valves, said valved conduits, main valves, and port valves being independently adjustable to independently vary the quantity and type of processing fluid directed into the associated chambers and tunnel.

15. A fish cooking apparatus comprising a pair of vertically elongated hot air chambers, an elongated steam chamber connected to and disposed between said hot air chambers and communicating therewith adjacent the upper end thereof, a hot air tunnel connected to each hot air chamber adjacent the lower end thereof, means for receiving open-topped, fish-filled cans in random formation and for continuously advancing the cans through said hot air tunnels, hot air chambers, and steam chamber, a driven blower having an inlet end and an outlet end mounted on one of said hot air chambers, a pressure duct communicating with said outlet end of said blower and having a plurality of ports communicating with said steam chamber at longitudinally spaced intervals therealong and having a plurality of vertically spaced ports communicating with said hot air chamber, a main valve in said pressure duct disposed between said outlet ends of said blower and said ports that communicate with said steam chamber, a second main valve in said pressure duct disposed between said outlet end of said blower and said ports that communicate with said hot air chamber, a suction duct connected to the inlet end of said blowers and having a plurality of spaced suction ports communicating with said hot air chamber and with said adjacent tunnel, a valve in each of said suction and pressure ports, valved steam conduits communicating with said ducts at points downstream of both of said main valves, and valved smoke conduits communicating with said ducts at point downstream of both of said main valves, said valved conduits, main valves and port valves being independently adjustable to independently vary the quantity and type of processing fluid directly into the associated chambers and tunnel.

16. In a fish cooking apparatus, a vertically elongated heat treatment chamber, a horizontally elongated heat treatment chamber communicating with the upper end portion of said vertical chamber, a tunnel communicating with the lower end portion of said vertical chamber, means for receiving fish filled cans at random and for advancing the cans through said tunnel and said chamber, a can inverting mechanism in said vertically elongated heat treatment chamber for inverting the containers prior to their advancement into said horizontally elongated chamber, a driven blower mounted on one of said chambers and having an inlet and an outlet end, a pressure duct communicating with said outlet end and having a horizontal branch extending over said horizontal chamber and a vertical branch extending downwardly along said vertical chamber, a plurality of first ports spaced longitudinally of said horizontal chamber and establishing communication between said horizontal chamber and said horizontal branch, a plurality of second ports establishing communication between said vertical chamber and said vertical branch at vertically spaced intervals therealong, a plurality of baffles in said vertical chambers with one baffle being disposed between adjacent second ports, a suction duct communicating with said inlet end of said blower, a plurality of spaced suction ports establishing communication between said suction duct and said vertical chamber and between said suction duct and said tunnel, a first main valve positioned in said horizontal branch of the pressure duct between the outlet end of said blower and said first ports, a second main valve positioned in said vertical branch of the pressure duct between the outlet end of said blower and said second ports, and a valve disposed in each port, said valves all being independently adjustable to vary the location of the hot air treatment and the duration of the hot air treatment.

17. A fish cooking apparatus comprising a pair of hot air chambers, a steam chamber disposed between said hot air chambers and communicating therewith, inverting means mounted for rotation in each hot air chamber, a fish retaining conveyor disposed within said hot air chambers and said steam chamber and forming a part of said inverting means, means for driving said fish retaining conveyor and said inverting means, a continuously driven feed conveyor disposed adjacent one of said inverting means and extending transversely thereof, resiliently mounted deflecting means mounted in position to deflect cans onto a first half of said one inverting means, and a fixed deflecting means mounted in position to deflect articles onto a second half of said inverting means, said resiliently mounted deflecting means being moved away from the deflecting position when said first half of said inverting means becomes fully loaded allowing other articles on said feed conveyor to be moved beyond said resiliently mounted deflecting means for deflection by said fixed deflecting means onto said second half of said inverting means.

18. A fish cooking apparatus comprising a pair of hot air chambers, a steam chamber disposed between said hot air chambers and communicating therewith, inverting means mounted for rotation in each hot air chamber, a fish retaining conveyor disposed within said hot air chambers and said steam chamber and forming a part of said inverting means, means for driving said fish retaining conveyor and said inverting means, means for directing open-topped cans of fish in random formation into one of said inverting means, a first conveyor driven at low speed and disposed transversely of said other inverting means for receiving cans from said other inverting means, a second conveyor driven at intermediate speed and disposed parallel and adjacent to said low speed conveyor for receiving cans therefrom, a third conveyor driven at high speed and disposed parallel and adjacent to said low speed conveyor for receiving cans therefrom, a deflector disposed obliquely across said low speed conveyor and said intermdeiate speed conveyor to deflect the cans onto said high speed conveyor, and singulating means adapted to receive the cans from said deflector and orient the cans in single file on said high speed conveyor.

19. In a fish cooking apparatus a discharge conveyor assembly comprising a low speed conveyor, an intermediate speed conveyor disposed parallel to and immediately adjacent to said low speed conveyor, a high speed conveyor disposed parallel to and immediately adjacent said intermediate speed conveyor, means connected to said conveyors for driving said conveyors in the same direction, means for advancing a continuous supply of cans transversely onto said low speed conveyor, a deflector disposed obliquely across said low speed conveyor and said intermediate speed conveyor to deflect the cans onto said high speed conveyor, a pair of spaced wheels disposed in position to receive cans from said deflector and discharge them in single file on said high speed conveyor, and means for driving said wheels so that the adjacent surfaces thereof move in the same direction and at substantially the same speed as said high speed conveyor, said spaced wheels cooperating to engage and twist cans having one face dimension greater than the other so that the larger face dimension of each can will be disposed parallel to the path of movement of the high speed conveyor.

References Cited by the Examiner
UNITED STATES PATENTS

| | | | |
|---|---|---|---|
| 747,151 | 12/03 | Dixon | 99—362 |
| 1,344,350 | 6/20 | Norland | 99—260 |
| 1,385,000 | 7/21 | Griffing | 199—33.4 X |
| 1,922,908 | 8/33 | Coleman | 198—194 |
| 2,315,880 | 4/43 | Stiles | 198—32 |
| 2,355,798 | 8/44 | Guthier | 99—443 |
| 2,493,837 | 1/50 | Smith | 198—165 X |
| 2,605,883 | 8/52 | Thames | 198—33.4 |
| 2,607,698 | 8/52 | Martin. | |
| 2,615,309 | 10/52 | De More | 198—159 X |
| 2,709,955 | 6/55 | Hunter | 99—443 X |
| 2,734,213 | 2/56 | Ashford | 198—33.4 |
| 2,741,978 | 4/56 | Cheftel et al. | 99—443 X |
| 2,779,102 | 1/57 | Baker | 198—165 X |

FOREIGN PATENTS 623,482  5/49  Great Britain.

JEROME SCHNALL, *Primary Examiner.*

GEORGE A. NINAS, Jr., *Examiner.*